US007735340B2

(12) United States Patent
Burdette et al.

(10) Patent No.: US 7,735,340 B2
(45) Date of Patent: Jun. 15, 2010

(54) METHOD AND APPARATUS FOR HOMOGENIZING A GLASS MELT

(75) Inventors: Steven R Burdette, Big Flats, NY (US); Raymond E Fraley, Waverly, NY (US); Steven R Wagner, Danville, KY (US)

(73) Assignee: Corning Incorporated, Corning, NY (US)

( * ) Notice: Subject to any disclaimer, the term of this patent is extended or adjusted under 35 U.S.C. 154(b) by 348 days.

(21) Appl. No.: 11/974,873

(22) Filed: Oct. 16, 2007

(65) Prior Publication Data

US 2008/0041109 A1 Feb. 21, 2008

Related U.S. Application Data

(63) Continuation of application No. 10/930,540, filed on Aug. 31, 2004, now abandoned.

(51) Int. Cl.
*C03B 5/18* (2006.01)
(52) U.S. Cl. .................. 65/135.2; 65/135.3; 65/346; 65/178
(58) Field of Classification Search ............ 65/135.2, 65/135.3, 346, 178
See application file for complete search history.

(56) References Cited

U.S. PATENT DOCUMENTS

| 2,569,459 | A | 10/1951 | DeVoe | 49/77 |
| 2,716,023 | A | 8/1955 | Cleveland | 259/6 |
| 2,831,664 | A | 4/1958 | Spremulli | 259/107 |
| 3,233,993 | A | 2/1966 | Weidel | 65/374 |
| 3,352,659 | A | 11/1967 | Rahe | 65/178 |
| 3,971,646 | A | 7/1976 | Rhodes | 65/157 |
| 2002/0178753 | A1 | 12/2002 | Dick et al. | 65/86 |
| 2003/0101750 | A1 | 6/2003 | Goller et al. | 65/135.3 |

FOREIGN PATENT DOCUMENTS

| JP | 09295815 | | 11/1997 |
| JP | 2002145626 | | 5/2002 |
| JP | 2002 253942 | * | 9/2002 |
| JP | 2002-253942 | | 9/2002 |

* cited by examiner

*Primary Examiner*—Mark Halpern
(74) *Attorney, Agent, or Firm*—Kevin M. Able

(57) ABSTRACT

The present invention is directed toward a method of reducing contamination of a glass melt by oxide particulates, such as particulates of platinum oxide, which may condense on the inside surfaces of a stir chamber, particularly the stir shaft, and fall back into the glass melt. The method includes causing a flow of gas through an annular space between the shaft and the chamber cover. In one embodiment, the flow of gas through the annular space is caused by drawing a vacuum in the chamber. An apparatus for practicing the method is also provided.

10 Claims, 2 Drawing Sheets

METHOD AND APPARATUS FOR HOMOGENIZING A GLASS MELT

This is a continuation of U.S. patent application Ser. No. 10/930,540 filed on Aug. 31, 2004 now abandoned, the content of which is relied upon and incorporated herein by reference in its entirety, and the benefit of priority under 35 U.S.C. §120 is hereby claimed.

BACKGROUND OF THE INVENTION

1. Field of the Invention

The invention relates generally to a method of reducing contaminants in a glass melt, and more specifically to reducing condensation-formed contaminants during a glass stirring process.

2. Technical Background

Chemical and thermal homogeneity is a crucial part of good glass forming operations. The function of a glass melting operation is generally to produce glass with acceptable levels of gaseous or solid inclusions, but this glass usually has cord (or striae or ream) of chemically dissimilar phases. These non-homogeneous components of the glass result from a variety of normal occurrences during the melting process including refractory dissolution, melting stratification, glass surface volatilization, and temperature differences. The resulting cords are visible in the glass because of color and/or index differences.

One approach for improving the homogeneity of glass is to pass the molten glass through a vertically-oriented stir chamber located downstream of the melter. Such stir chambers are equipped with a stirrer having a central shaft which is rotated by a suitable motor. A plurality of blades extend from the shaft and serve to mix the molten glass as it passes from the top to the bottom of the stir chamber. The present invention is concerned with the operation of such stir chambers without introducing further defects into the resulting glass, specifically, defects arising from condensed oxides.

Volatile oxides in a glass stir chamber can be formed from any of the elements present in the glass and stir chamber. Some of the most volatile and damaging oxides are formed from Pt, As, Sb, B, and Sn. Primary sources of condensable oxides in a glass melt include hot platinum surfaces for $PtO_2$, and the glass free surface for $B_2O_3$, $As_4O_6$, $Sb_4O_6$, and $SnO_2$. By glass free surface what is meant is the surface of the glass which is exposed to the atmosphere within the stir chamber. Because the atmosphere above the glass free surface, and which atmosphere may contain any or all of the foregoing, or other volatile materials, is hotter than the atmosphere outside of the stir chamber, there is a natural tendency for the atmosphere above the free glass surface to flow upward through any opening, such as through the annular space between the stirrer shaft and the stir chamber cover. Since the stir chamber shaft becomes cooler as the distance between the stirrer shaft and the glass free surface increases, the volatile oxides contained with the stir chamber atmosphere will condense onto the surface of the shaft if the shaft and/or cover temperature are below the dew point of the oxides. When the resulting condensates reach a critical size they can break off, falling into the glass and causing inclusion or blister defects in the glass product.

Heating the shaft above the glass free surface has proven only partially successful in reducing particulate contamination in the glass melt, resulting only in a stratification of the condensation.

One prior art method of reducing contamination of the glass melt by condensates has been to dispose a disc-shaped shield between the glass free surface and upper portions of the stir chamber. However, such methods may make it difficult to control the temperature of the glass free surface, such as by heating the chamber cover above the glass. In addition, the joint between the shield and the stirrer shaft may serve as an additional source of condensate contamination.

SUMMARY

In one broad aspect of the invention, a method of stirring a glass melt is provided comprising flowing molten glass through a stir chamber, the stir chamber having at least one wall and a cover, the cover having a passage therethrough. The stir chamber further includes a stirrer comprising a shaft which extends through the cover passage, thereby forming an annular gap between the shaft and the cover. A gas is flowed through the annular gap at a rate of at least about 100 sccm (standard cubic centimeters per minute). Preferably the gas is flowed at a rate of at least about 400 sccm, more preferably at least about 900 sccm and most preferably at a rate of at least about 1200 sccm. The flow of gas is preferably everywhere downward through the annular gap. Preferably, the gas flows at a velocity of at least about 0.35 m/s for an annular gap of about 0.25 inches (0.635 cm). Preferably, the gas is air, although other gases may be used, as appropriate. The method advantageously causes the gas to flow along the stirrer shaft, thereby reducing the condensation of volatile oxides along the shaft at a predetermined rate, which may thereafter dislodge and contaminate the molten glass.

Also disclosed is a preferred apparatus for practicing the method disclosed herein (i.e. stirring a glass melt) comprising a stir chamber configured to hold molten glass and a stir chamber cover, the cover defining a passage therethrough, a stirrer having a shaft extending through the cover into the stir chamber, thereby forming an annular gap between the cover and the shaft, one or more gas flow tubes for evacuating the stir chamber, the flow tubes having an end within the stir chamber, the end of the flow tube not extending overtop a surface of the molten glass.

In an alternative embodiment of the apparatus, an annular spacer plate may be positioned between the cover and the stir chamber wall, the spacer plate comprising gas flow passages for evacuating or pressurizing the stir chamber. The gas flow passages may be connected to a manifold. The manifold is in fluid communication with a vacuum system or with a compressor system, depending upon whether or not the stir chamber is to be evacuated or pressurized with a gas.

The invention will be understood more easily and other objects, characteristics, details and advantages thereof will become more clearly apparent in the course of the following explanatory description, which is given, without in any way implying a limitation, with reference to the attached Figures.

DETAILED DESCRIPTION

Figure 1:
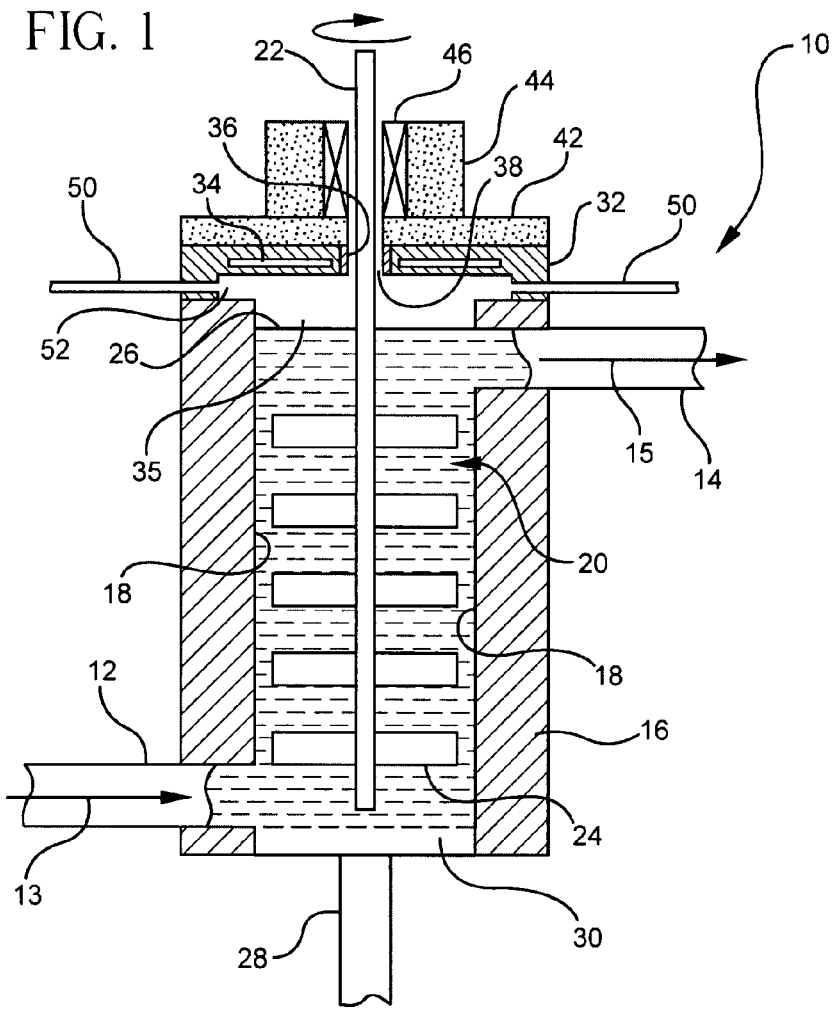
FIG. 1 is a cross sectional view of an exemplary stir chamber according to an embodiment of the present invention showing the chamber cover and the gas flow pipes which enter the region of the chamber above the level of the glass free surface.

FIG. 1 illustrates an exemplary apparatus for practicing a method for homogenizing a glass melt according to an embodiment of the present invention. Stir chamber 10 of FIG. 1 includes an inlet pipe 12 and an outlet pipe 14. In the illustrated embodiment, molten glass flows into the stir chamber, as indicated by arrow 13, through inlet pipe 12, and flows out of the chamber, as shown by arrow 15, through outlet pipe 14. Stir chamber 10 includes at least one wall 16 which is preferably cylindrically-shaped and substantially vertically-oriented, although stir chamber may have other shapes such as oval or hexagonal. Preferably, the stir chamber wall includes an inner lining 18 comprising platinum or a platinum alloy. Other lining materials having similar refractory properties, including resistance to corrosion, as well as electrical conductivity, may be substituted. Glass inlet pipe 12 is located at or near the bottom of stir chamber 10 whereas glass outlet pipe 14 is located near the top of the stir chamber. However, it will be recognized by the skilled artisan that inlet pipe 12 and outlet pipe 14 may be reversed, such that the molten glass flows into the stir chamber from the top and flows out through the bottom of the stir chamber. Intermediate positions for the inlet and outlet pipes may also be employed provided adequate stirring (i.e. the desired amount of homogenization) is achieved.

Stir chamber 10 further includes a stirrer 20 comprising shaft 22 and a plurality of blades 24 which extend outward from the shaft towards wall 16 of the stir chamber. Shaft 22 is typically substantially vertically-oriented and rotatably mounted such that blades 24 which extend from the lower portion of the shaft rotate within the stir chamber at least partially submerged below free surface 26 of the molten glass. The molten glass surface temperature is typically in the range between about 1400° C. to 1600° C., but may higher or lower depending upon the glass composition. Stirrer 20 is preferably composed of platinum, but may be a platinum alloy, or a dispersion-strengthened platinum or platinum alloy (e.g., a zirconia-strengthened platinum alloy).

As shown in FIG. 1, stir chamber 10 may include a drain tube 28 for removing glass from the stir chamber during, for example, shut down of the system. In addition (or alternatively), the stir chamber may include an optional sump 30. Stirrer 20 is rotated by a suitable drive. For example, stirrer 20 may be rotated by an electric motor (not shown) through appropriate gearing or by a belt drive.

In accordance with the present embodiment, stir chamber 10 is covered by chamber cover 32. Chamber cover 32 may rest directly upon wall 16, or high temperature sealing material may be disposed between the wall and the cover, the seal between the wall and the cover in any event being sufficient to prevent appreciable gas flow between the cover and the wall. Cover 32 may also include cover heater 34 for heating the chamber cover and therefore helping to control the free surface temperature of the glass melt flowing through the stir chamber. Cover heater 34 typically includes a resistance coil, typically comprising platinum, imbedded within the chamber cover refractory material. The resistance coil is supplied with an electric current, preferably alternating current, although direct current may be applied, to thereby heat the chamber cover. The chamber cover is typically between about 2 inches (5.08 cm) and 3 inches (7.62 cm) from the free surface of the glass melt, but this distance may be greater, as needed. Thus, volume 35 is defined between the stir chamber cover 32, stir chamber wall 16 and glass free surface 26.

Chamber cover 32 also includes a passage through which stirrer shaft 22 passes. The inside surface of the passage may include a lining which forms casing 36. As with other components of the stir chamber, it is desirable that casing 36 be resistant to corrosion due to the high temperature and the corrosive gases and condensates which may develop from the molten glass. Casing 36 typically comprises platinum or a platinum alloy. Shaft 22 passing through the chamber cover passage forms annular gap 38 between the outside surface of shaft 22 and the inside surface of either the passage or, should casing 36 be employed, the annular gap is formed between the outside surface of the shaft and the inside surface of the casing. For the purpose of eliminating confusion, reference shall be made hereinafter only to the inside surface of the casing, but shall be construed to mean both instances, whichever applies. That portion of shaft 22 above chamber cover 32 is surrounded by a refractory material containing shaft heater 40. Shaft heater 40, as in the case of cover heater 34, preferably comprises a resistance heating element. The heating element is preferably comprised of platinum, but may be a platinum alloy.

Figure 2:
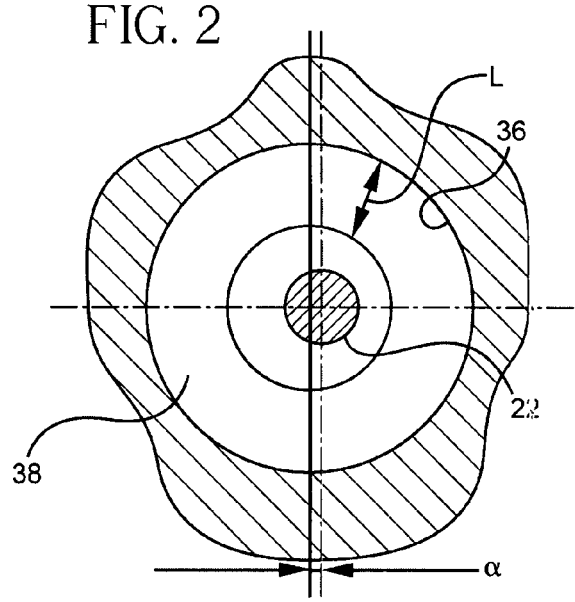
FIG. 2 illustrates the offset between the center of the inside perimeter of the cover passage and the center of the stirrer shaft.

An insulation layer 42 is disposed overtop chamber cover 32. Insulation layer 44 similarly surrounds shaft heater 46. Annular gap 38 eliminates contact between the rotating shaft and the casing, heaters, insulation and cover. Preferably, the center of the inside circular perimeter of the casing, i.e. the center circumscribed by the annular space, is offset from the center of the shaft by no more than about 0.15 inches (0.381 cm), more preferably no more than about 0.12 inches (0.305 cm), and most preferably by no more than about 0.04 inches (0.102 cm). This is illustrated by FIG. 2 showing offset $\alpha$ between the shaft center and the annulus center. Preferably, width L of the annular gap is at least about 0.25 inches (0.635 cm), but may be greater than about 0.5 inches (1.27 cm).

According to the present embodiment, at least one flow tube 50 extends from outside stir chamber 10 to the inside of stir chamber 10, i.e. volume 35. Each flow tube should be constructed from a material capable of withstanding the high temperatures present in the chamber, typically in excess of 1400° C., without substantial degradation due to contact with the oxide condensates. Each flow tube typically has an inside diameter of at least about 0.5 inches (1.27 cm), and is preferably comprised of platinum, although other materials, such as a platinum alloy, may be used, provided the material exhibits a resistance to corrosion or other forms of degradation (such as cracking) which may result from the harsh stir chamber environment.

Advantageously, end 52 of gas flow tube 50, which is within stir chamber 10, is positioned such that it does not extend directly over glass free surface 26 within the chamber. FIG. 1 depicts two gas flow tubes. As shown by FIG. 1, gas flow tube ends 52 may terminate within an annular region overtop the walls of the stir chamber rather than terminating in a position above free surface 26 of the glass melt. Thus, it is an advantage of the embodiment that condensate which may accumulate at gas flow tube ends 52, and which may subsequently dislodge, is prevented from falling onto the glass free surface 26. Condensate falling onto the free surface of the glass melt may result in contamination of the melt, and be manifest as inclusions or other defects within the glass article produced from the melt.

To overcome an upward flux of volatilized oxides through the annular gap between the stirrer shaft and the cover casing due to diffusion with a downward flux through the gap due to convection, the Peclet number, defined below, is preferably large in relation to the value 1:

$$Pe = \frac{U \cdot L}{D}$$

In the above equation, Pe is the Peclet number, U is the downward gas velocity in m/s L is the width of the annulus between the cover casing and the outer surface of stir shaft 22 in meters, and D is the oxide diffusivity in m²/s. Condensation of volatile oxides along the stirrer shaft, and in particular within and above annulus 38 surrounding the stir shaft, can be eliminated by causing a suitably high downward gas velocity U. At the same time, it is also desirable to minimize the gas velocity to reduce evaporation of oxides from the glass free surface as much as possible and to limit cooling of glass free surface 26 due to the flow of gas through annulus 38. These competing requirements should be reasonably balanced.

Another gas velocity limit exists due to instability from the opposing temperature gradient. Since stir shaft 22 is cooler (typically by at least about 800° C.) above chamber cover 32 than below the cover, an instability in the gas flow through annulus 38 due to buoyancy may occur when there is an insufficient flow of gas through annulus 38. Convection cells may develop within annulus 38 such that in some areas of the annulus the gas flow is upward and in others downward. Such convection cells may aid the transport of volatile oxides into annulus 38, and disrupt the flow of gas through the annulus. However, if gas velocity U is sufficiently large in the downward direction, instability due to buoyancy can be overcome In one embodiment of the inventive method using the apparatus just described, a vacuum is drawn on volume 35 above glass free surface 26 through the at least one gas flow tube 50 of the apparatus by a suitable vacuum system (not shown), such as by a vacuum pump and associated piping. In other words, one end of gas flow tube 50 extends into volume 35 within the stir chamber, while the opposite end is connected to a suitable vacuum system, the vacuum system therefore being in fluid communication with the inside of the stir chamber via gas flow tube 50. The vacuum pump may be, for example, a venturi pump driven by compressed air, although other vacuum pumps as are known in the art may be used. Preferably, the surfaces of the gas flow tube are at a temperature lower than the temperature of the molten glass surface, and preferably lower than the dew point of the volatile oxides within volume 35 so that volatized oxides removed from the stir chamber through gas flow tubes 50 may condense within the flow tubes rather than on shaft 22 or on the inner surface of casing 36. The dew points of the volatile oxides in the volume above the glass free surface depend on the glass composition and the temperatures of the surfaces present within volume 35. Calculations of the dew points of oxides along the shaft can be made based on the temperature profile along the shaft, the diffusivity of a particular oxide, the gas flow velocity U through annular gap 38, and the dew point vs. concentration curve for the oxide. Dew points for common volatile oxides may be as low as 559° C. for $As_4O_6$ to as high as 1455° C. for $PtO_2$.

A gas flow rate may be chosen which will maintain the oxide dew points below the shaft temperature at all points along the shaft. Since it is preferable that volatilized oxides condense within the gas flow tube rather than along shaft 22, gas flow tube 50 may be designed such that individual flow tubes are replaceable and may further include filtration to keep condensed oxides from fouling the vacuum system. Filtration may comprise a stainless steel mesh or wool in a suitable can or container through which the gas flows, such as are commercially available, for example, through Nor-Cal Products, Inc.

The pressure differential between the reduced pressure within volume 35 and the atmospheric pressure outside of the tank causes a flow of atmospheric gas from outside the stir chamber through annular gap 38 into volume 35. The velocity and volume of the gas flow is preferably sufficiently large that gas flow is everywhere downward in annulus 38 (for the case where a vacuum is drawn on volume 35) in spite of a destabilizing temperature gradient which may be present. Additionally, the gas velocity should be sufficiently large so as to eliminate transport of condensable materials upward, through the annular gap, by diffusion. Preferably, the flow of atmospheric gas through annular gap 38 is at least about 100 sccm, more preferably between about 400 sccm and about 900 sccm, although flow rates may be as high as 1600 sccm.

Figure 3:
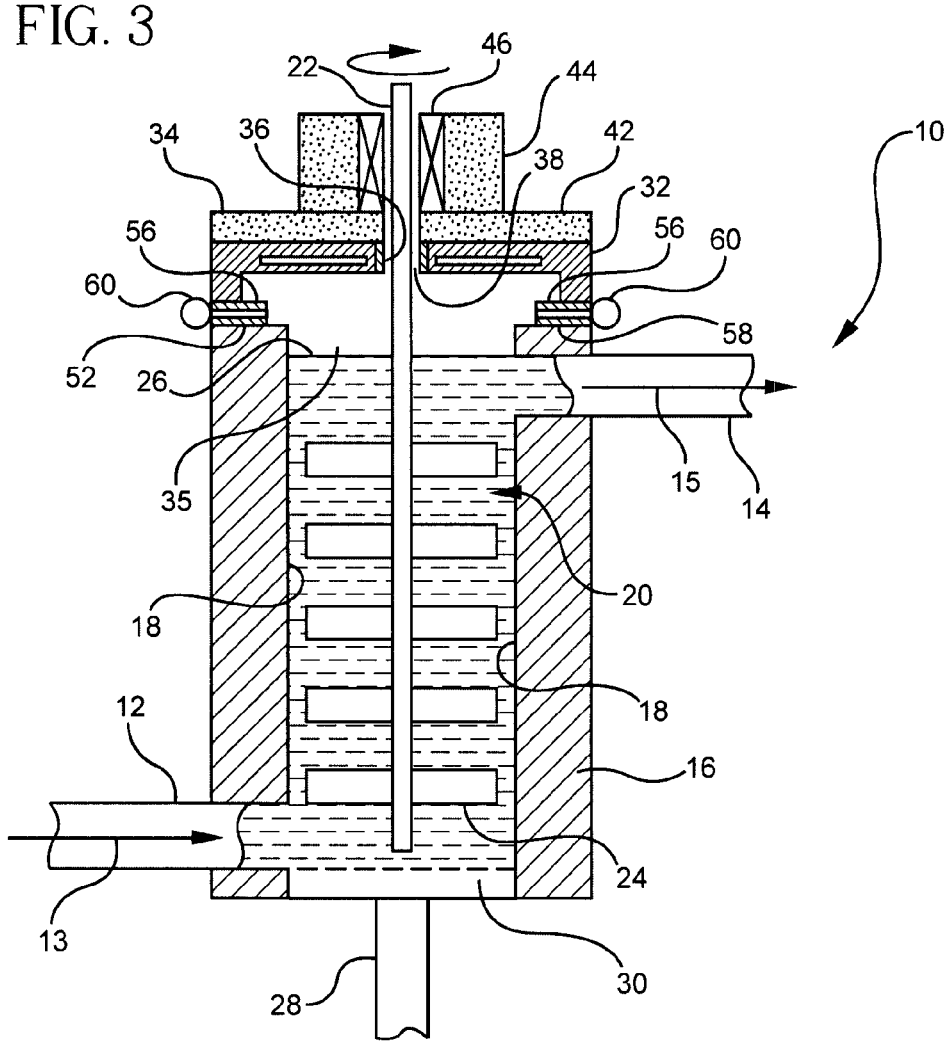
FIG. 3 is a cross sectional view of an exemplary stir chamber according to another embodiment of the present invention showing the stir chamber, the stir chamber cover, and a spacer plate disposed between the chamber and the chamber cover.
Figure 4:
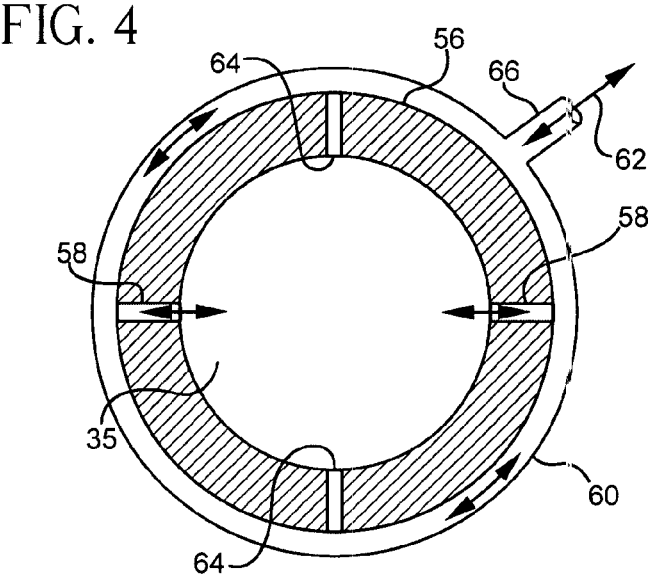
FIG. 4 is a horizontal cross section view of a spacer plate, including a gas manifold, which may be used between the stir chamber wall and the cover, the spacer plate have passages for evacuating or pressurizing the stir chamber.

In another embodiment of the inventive apparatus, and as illustrated in FIG. 3, spacer plate 56 may be interposed between stir chamber wall 16 and cover 32. Spacer plate 56 comprises at least one gas flow passage 58 through the plate which serves the same function as the gas flow tubes in the previous embodiment. In the present embodiment, gas flow tubes 50 may not be required. Spacer plate 56 preferably contains a plurality of gas flow passages 58 disposed about the circumference of the plate. The at least one gas flow passage may be connected individually to a vacuum system or a compressor system. However, manifold 60 may surround the spacer plate and connect the at least one gas flow passage to the vacuum system or the compressor system, depending upon whether a positive pressure or a negative pressure, with respect to atmospheric pressure, is desired in volume 35' defined between cover 32, glass surface 26 and spacer 56. The use of a manifold may be desired when multiple gas flow passages are utilized. As previously disclosed, a filter system is desirable to remove condensate which may accumulate within the gas flow passages or downstream piping. The apparatus of FIG. 3 is shown without gas flow tubes 50, however gas flow tubes 50 may also be used if desired. FIG. 4 shows spacer plate 56 and manifold 60 as a horizontal cross section, looking down on the spacer plate. Arrow 62 indicates gas flow into or out of the manifold, depending upon whether manifold 60 is connected to a vacuum system for evacuating the stir chamber, or if the manifold is connected to a compressor system for pressurizing the stir chamber.

As in the case of the glass flow tubes of the previous embodiment, it is preferable that the gas flow passage openings 64 which open into volume 35 of the stir chamber are set back from the inside surface of stir chamber wall 16 so that any volatile oxides which may condense around the openings does not fall into the molten glass within the stir chamber. A filter system as previously described may be suitably installed, for example, in pipe 66 connecting manifold 60 with the vacuum system (no shown).

While various descriptions of the present invention are described above, it is understood that the various features described in connection with the embodiments of the present invention can be used singly or in combination thereof. For example, gas flow passages could be formed in the cover itself, or within an upper portion of the chamber wall. Therefore, this invention is not to be limited to the specifically preferred embodiments depicted therein.

It will be apparent to those skilled in the art that various other modifications and variations can be made to the present invention without departing from the spirit and scope of the invention. Thus it is intended that the present invention cover the modifications and variations of this invention provided they come within the scope of the appended claims and their equivalents.

What is claimed is:

1. A method of stirring a glass melt comprising:
   flowing molten glass through a stir chamber comprising a cover having a passage therethrough and an interior volume containing at least one volatilized oxide between the molten glass and the cover, the stir chamber further including a platinum or platinum alloy stirrer comprising a shaft extending through the cover passage, there being an annular gap between the shaft and the cover; and
   flowing air external to the stir chamber downward through the annular gap into the interior volume at a rate sufficient to prevent an upward gas flow within the annular gap.

2. The method according to claim 1 wherein the at least one volatilized oxide comprises $PtO_2$ or $As_4O_6$.

3. The method according to claim 1 wherein the air is flowed at a rate greater than about 100 sccm.

4. The method according to claim 1 wherein the air is flowed at a rate between about 400 sccm and about 900 sccm.

5. The method according to claim 1 wherein flowing air into the volume comprises drawing a vacuum on the volume through a gas flow tube disposed within the stir chamber.

6. A method of stirring a glass melt comprising:
   flowing molten glass through a stir chamber, the stir chamber having at least one wall comprising platinum and a cover, the cover having a passage therethrough, the stir chamber further including a platinum-containing stirrer comprising a shaft which extends through the cover passage, thereby forming an annular gap between the shaft and the cover, and wherein the stir chamber comprises an interior volume above a free surface of the molten glass flowing therethrough;
   flowing air downward through the annular gap from an atmosphere exterior to the stir chamber into the volume above the free surface of the molten glass; and
   wherein the air flows through the annular gap at a rate sufficient to prevent an upward gas flow within the annular gap.

7. The method according to claim 6 wherein the interior volume comprises volatized oxide $PtO_2$.

8. The method according to claim 6 wherein a Peclet number of the annular gap is greater than 1.

9. The method according to claim 6 wherein the air is flowed at a rate greater than about 100 sccm.

10. The method according to claim 6 wherein the air is flowed at a rate between about 400 sccm and 900 sccm.

* * * * *

UNITED STATES PATENT AND TRADEMARK OFFICE
CERTIFICATE OF CORRECTION

PATENT NO. : 7,735,340 B2  Page 1 of 1
APPLICATION NO. : 11/974873
DATED : June 15, 2010
INVENTOR(S) : Steven R. Burdette et al.

It is certified that error appears in the above-identified patent and that said Letters Patent is hereby corrected as shown below:

| No. | Col. | Line | Description |
|---|---|---|---|
| 1 | 8 | 18 | Please delete "volatized" and add --volatilized-- |

Signed and Sealed this

Twenty-fourth Day of August, 2010

David J. Kappos
*Director of the United States Patent and Trademark Office*